United States Patent
Venkatasubramanian et al.

(10) Patent No.: US 9,823,938 B2
(45) Date of Patent: Nov. 21, 2017

(54) PROVIDING DETERMINISTIC, REPRODUCIBLE, AND RANDOM SAMPLING IN A PROCESSOR

(71) Applicant: Intel Corporation, Santa Clara, CA (US)

(72) Inventors: Girish Venkatasubramanian, Santa Clara, CA (US); Jamison D. Collins, San Jose, CA (US); Jason M. Agron, San Jose, CA (US); Polychronis Xekalakis, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/742,908

(22) Filed: Jun. 18, 2015

(65) Prior Publication Data

US 2016/0371065 A1     Dec. 22, 2016

(51) Int. Cl.
    *G06F 9/45*     (2006.01)
    *G06F 9/455*     (2006.01)
    *G06F 9/30*     (2006.01)

(52) U.S. Cl.
    CPC ............ *G06F 9/45516* (2013.01); *G06F 9/30* (2013.01)

(58) Field of Classification Search
    CPC .... G06F 8/41; G06F 11/3636; G06F 11/3648; G06F 9/30; G06F 9/45516
    USPC ........................................ 717/130, 140, 158
    See application file for complete search history.

(56) References Cited

U.S. PATENT DOCUMENTS

| | | | | |
|---|---|---|---|---|
| 6,092,180 | A * | 7/2000 | Anderson | G06F 8/445 712/200 |
| 6,195,748 | B1 * | 2/2001 | Chrysos | G06F 9/30101 712/227 |
| 7,318,145 | B1 * | 1/2008 | Stribaek | G06F 9/30072 712/219 |
| 7,418,581 | B2 * | 8/2008 | Chaudhry | G06F 9/3842 712/227 |
| 2006/0225135 | A1 | 10/2006 | Cheng et al. | |
| 2007/0070907 | A1 * | 3/2007 | Kumar | H04L 47/10 370/235 |
| 2009/0271867 | A1 | 10/2009 | Zhang | |
| 2010/0306847 | A1 | 12/2010 | Lambert et al. | |
| 2011/0016508 | A1 | 1/2011 | Wallace | |

(Continued)

FOREIGN PATENT DOCUMENTS

WO     WO2014133520     9/2014

OTHER PUBLICATIONS

Zilles et al, "A Programmable Co-processor for Profiling", Jan. 2001, Seventh International Symposium on High Performance Computer Architecture (HPCA-7), 12 pages.*

(Continued)

*Primary Examiner* — Ted T Vo
(74) *Attorney, Agent, or Firm* — Trop, Pruner & Hu, P.C.

(57) ABSTRACT

In one embodiment, a processor includes a front end unit to fetch and decode an instruction. The front end unit includes a first random number generator to generate a random value responsive to a profileable event associated with the instruction. The processor further includes a profile logic to collect profile information associated with the instruction responsive to a sample signal, where the sample signal is based on at least a portion of the random value. Other embodiments are described and claimed.

17 Claims, 11 Drawing Sheets

(56) References Cited

U.S. PATENT DOCUMENTS

2012/0117610 A1    5/2012  Pandya

OTHER PUBLICATIONS

Richard Fitzpatrick, "Random numbers", 2006, retrieved from http://farside.ph.utexas.edu/teaching/329/lectures/node25.html, 2 pages.*

Intel Corporation, "Intel® Digital Random Number Generator (DRNG), Software Implementation Guide," Aug. 7, 2012, 35 pages.

U.S. Appl. No. 14/704,108, filed May 5, 2015, entitled, "Performing Partial Register Write Operations in a Processor," by Jayesh Iyer, et al.

* cited by examiner

PROVIDING DETERMINISTIC, REPRODUCIBLE, AND RANDOM SAMPLING IN A PROCESSOR

TECHNICAL FIELD

Embodiments relate to a processor that can perform sampling and profiling of code execution.

BACKGROUND

A dynamic binary translation (DBT) processor has binary translation (BT) layer software that is located transparently between the hardware and operating system (OS)/application software space. The BT software translates and optimizes code, installs the translated code (translation) in a translation cache and executes the optimized translation in lieu of native (non-translated) code. The translation uses a host instruction set architecture (ISA) implemented in the processor, which may or may not be the same as a guest ISA, namely the ISA used by guest binaries that are being translated.

Since the cost of optimization is to be recouped by performance gains from executing optimized translations, hot guest code (with a high dynamic execution code) is typically optimized more than cold code. This hot guest code is identified via profiling of the program during execution until particular execution thresholds are reached, which invoke the translator. While profiling can identify the appropriate code for translation, it also imposes an overhead on performance. If this overhead is too high then its effect will not be recouped even by the performance improvements from translating and optimizing the code.

DETAILED DESCRIPTION

Figure 1:
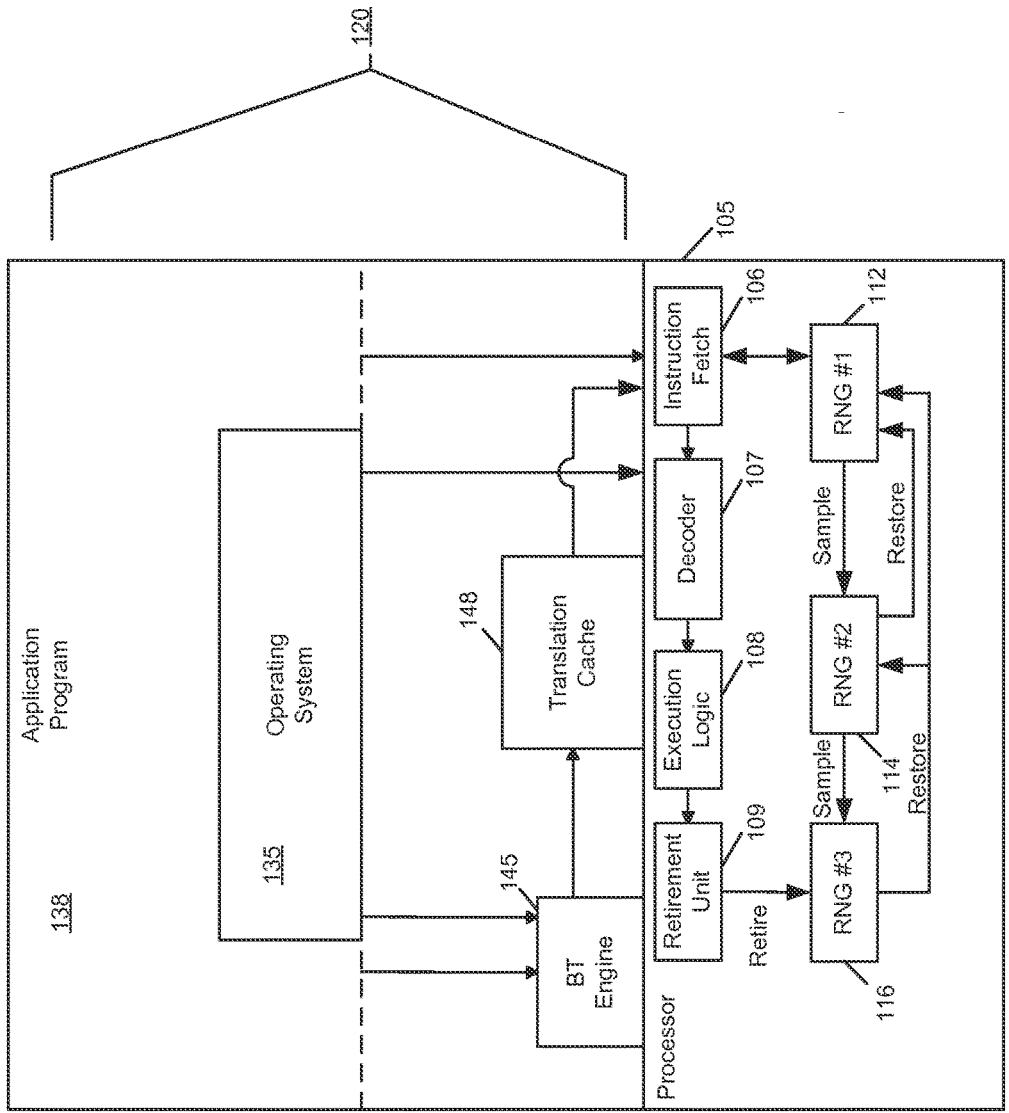
FIG. 1 illustrates components of a processor implemented as a co-designed hardware/software processor in accordance with an embodiment of the present invention.

Embodiments provide methods and apparatus for generating a deterministically-reproducible pseudo-random sampling occurrence to drive event sampling as part of execution optimization. Although the scope of the present invention is not limited in this regard, embodiments may be applicable to a variety of different processor architectures, including a DBT processor. In this way, low-overhead event profiling can be realized by selecting events to be profiled using sampling with a high degree of randomness (which may provide a number of benefits, briefly described below) while retaining deterministic and reproducible sampling behavior.

It is noted that the quality of event sampling profiling can directly impact performance benefits obtained by using a DBT processor, as it influences the region of code being translated as well as the optimizations performed during translation. A sampling scheme with limited randomness, e.g., a fixed sampling interval or a highly uniform sampling pattern, can risk generation of a poor or unrepresentative profile of the program's execution. Embodiments thus provide a random/pseudo-random sampling scheme to drive event sampling. However, the profile generated is at the same time reproducible to ensure consistent performance across multiple executions of the program, and deterministic to enable debugging and in particular validation of a co-designed hardware/software binary translator system. Embodiments provide techniques to generate a deterministic and reproducible sampling pattern of program execution. More specifically, embodiments provide a random sampling technique to guide profiling for achieving low overhead profiling while generating deterministically reproducible profiles of the executing code.

Typically, profiling includes gathering the dynamic execution counts for basic blocks and storing them in a database indexed by the physical address of the first instruction of the basic block. Since taken (not fall-through) branch targets are good candidates for the start of a translation, the profiling targets only the taken branch targets, in an embodiment.

The sampling driven profiling techniques described herein balance the following competing design goals: selection of events that are actually to be profiled out of all profileable events (that is, all the potential events that can be profiled); does not follow too regular of a pattern, e.g., sample every Nth occurrence; the profileable events that are sampled and actually profiled are non-speculative and independent of the state of micro-architectural structures, e.g., branch predictors; selection of the events that are actually profiled is repeatable, providing the potential of identical behavior among multiple executions of the same program; and the performance overhead may be small.

To realize these competing design goals, a pseudo-random sampling signal generator may be provided within a pipeline of the processor. More specifically, this generator (which, in an example embodiment, may present in a given processor such as an Intel® processor using an Intel® Digital Random Number Generator (DRNG) and/or Intel® Advanced Encryption Standard New Instructions (AESNI) technologies) may be provided in a front end unit of the processor. As used herein, a true random number generator and a pseudo-random number generator are both referred to generically as a "random number generator." This generator may be configured to observe all profileable events of interest and generate an output control signal, referred to herein as a "sample signal" or "sampling signal," indicating whether a particular event is to be sampled and actually profiled. This generator may be periodically re-seeded to increase the randomness of the sampling signal, in an embodiment.

In an embodiment, additional random number generators may be provided at those locations within the pipeline at which a partial or complete pipeline flush and recovery is possible, e.g., at a branch address calculation unit or other branch resolution unit and/or at a retirement unit. Each of these random number generators (also referred to as a sampling signal generator) may be configured to advance independently whenever it observes the event of interest. Sample generators earlier in the pipeline speculatively run ahead of those later in the pipeline. If a pipeline flush occurs, these earlier (in the pipeline) generators are controlled to revert back to the correct state. In an embodiment this may be accomplished by restoring the state of the more speculative generators with the current state of the generator instance at the flush position in the pipeline. For example, in the case of a full pipeline flush only the signal generator at retirement holds the correct state, and its state is used to restore all generators that are located earlier in the pipeline. Thus the later sampling signal generator serves as a checkpoint from which the generator(s) earlier in the pipeline can be restored.

In embodiments, the sampling signal generators may be initially seeded by DBT runtime software with a known seed value prior to the beginning of execution of a program. Although many different techniques may be used to seed these generators, in one embodiment a seed value may be provided via a machine specific register (MSR). With a repeatable seed, events that are sampled are identical between multiple runs of the same program. In some cases, the frequency of sampling can be lowered to reduce the number of events that are sampled and profiled, thereby lowering the overhead of profiling.

In embodiments the sampling signal generator takes the occurrence of a profileable event as an input, updates the internal state, and produces a sampling signal as an output. With multiple generators provided within a processor, a checkpointing mechanism ensures that a snapshot of the internal state of the generator is preserved.

In some embodiments, the sampling signal generator may be programmed to raise an event at periodic intervals, where the period may be specified in terms of the number of non-speculative profileable events. This event is used by the DBT runtime software to re-seed the random signal generator and avoid pathological corner cases that arise from using the same pseudo-random sequence over and over.

While the embodiments described herein use a linear feedback shift register (LFSR) as the random signal generator for profiling untranslated code for the execution counts of basic blocks to detect hot code worthy of being translated, other techniques are possible. In any case, profiling includes detecting the targets of taken branches and incrementing the execution counts associated with the targets. It should be noted however that embodiments are equally applicable to other types of random signal generators that maintain an internal state which is modified by the occurrence of profileable events and is used to compute the sample signal output.

To illustrate components of a processor implemented as a co-designed hardware/software processor in accordance with an embodiment of the present invention, reference is made to FIG. 1. As shown in FIG. 1, a co-design environment 100 includes a processor 105 and a memory 120, which in one embodiment may be a system memory such as a dynamic random access memory (DRAM). As seen, processor 105 may have a given micro-architecture and may be coupled to memory 120 by way of, e.g., a point-to-point interconnect, bus or other such manner. In a visible portion of memory 120, namely a first portion 130, one or more operating systems 135 and application programs 138 may be stored. This portion is termed "visible" as it can be visible to user-level code (i.e., application program 138) and visible to the OS (both OS 135 and program 138). Depending on the type of instructions to be executed in these programs, communication may be directly with processor 105, e.g., by way of using instruction decoders present in the processor to handle such instructions.

Alternately, for various code sequences that can be optimized using translated code or for such sequences in which micro-architecture support is not provided, embodiments may use a concealed portion of the memory, namely a second portion 140, in order to provide translated code to processor 105. Specifically, as seen, both OS 135 and application program 138 may communicate with a BT engine 145, which may include a runtime execution unit including profiling, interpretation, translation and optimization mechanisms. Note that concealed memory 140 is not visible or accessible to the OS or application programs. BT engine 145 may thus provide code and address information to a translation cache 148, which may include translated code that can be provided to processor 105 for execution. In one embodiment, code stored in translation cache 148 may be encrypted. This translated code may be written and optimized for the underlying micro-architecture of the processor, e.g., target ISA code.

As seen, processor 105 which may be a co-design processor, includes a pipeline having multiple units. These units include front end units such as an instruction fetcher 106 that can receive instructions directly from the OS, or application programs, and/or via translation cache 148. These instructions, which may be macro-instructions, e.g., corresponding to user-level instructions of an application program can be decoded using a decoder 107, which may operate to decode the instruction and access corresponding micro-operations (µops), e.g., present in a microcode storage of processor 105. In turn, decoder 107 may provide the uops to one or more execution units 108, which may include various arithmetic logic units (ALUs), specialized hardware and other types of computation units. Results from these instructions may be provided to a retirement unit 109, which operates to retire the instructions to thus store the results to an architectural state of the processor in program order, if no fault or exceptions occurred.

As further illustrated in FIG. 1, to enable random, deterministic and reproducible sampling as described herein, processor 105 may further include a set of random number generators coupled to various portions of the pipeline. Specifically as shown in FIG. 1, a first random number generator 112, also referred to herein as a speculative random generator, couples to instruction fetch unit 106. Responsive to receipt of a taken signal indicating a taken branch, random number generator 112 updates its internal state and may, depending upon its output, generate a sample signal indicating that the given taken branch has been selected for sampling, by way of output of a sample signal to a second random number generator 114 (which also may be a speculative random generator). Note also that this sample signal, by way of a sample indicator or bit can be appended to the corresponding instruction as it flows through the pipeline.

To provide for checkpointing, if the corresponding instruction is flushed a point in the pipeline prior to the corresponding location of random number generator 114, the internal state of that generator may be provided back to random number generator 112 to restore correct internal state as a checkpointing mechanism.

Still referring to FIG. 1, a third random number generator 116 may be associated with retirement unit 109 and may update its state responsive to an active sample signal and retirement indicator for a given instruction. This random number generator 116 is a non-speculative random generator, as this generator's state is updated only responsive to a valid retirement of a sampled instruction. In contrast, the earlier speculative generators may have their state flushed responsive to a flush affecting a given instruction. At this retirement point, various profiling information associated with the selected sampled instruction can be stored, e.g., in a profile database (which in an embodiment may be stored in concealed memory 140 (e.g., within BT engine 145)). Again, for purposes of checkpointing, should a sampled instruction be flushed after the location of pipeline of random number generator 114, an internal state of random number generator 116 may be used to restore a proper internal state of both random number generators 112 and 114. While described as an in-order machine, embodiments can equally be implemented using an out-of-order machine.

Figure 2:
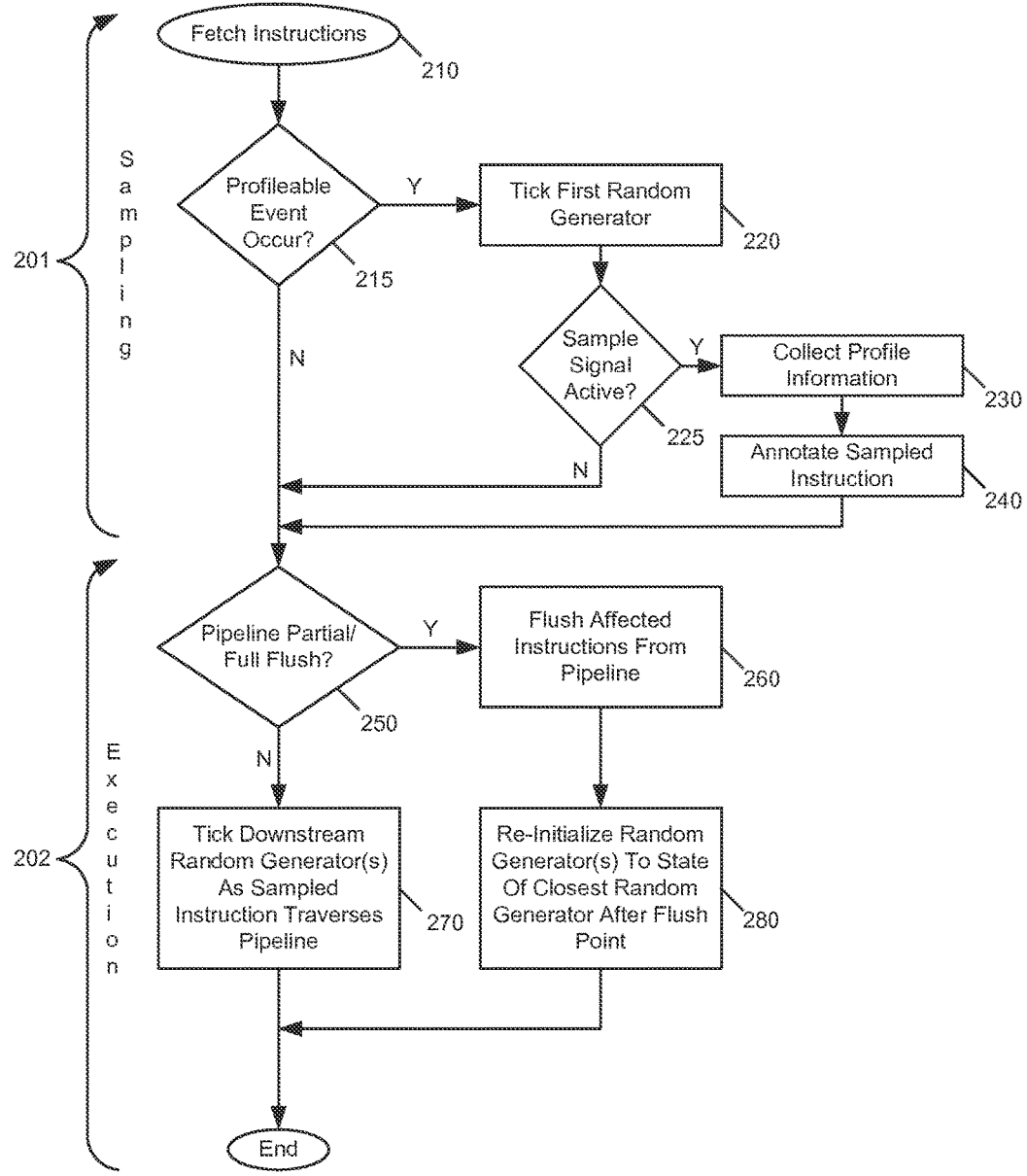
FIG. 2 is a flow diagram of a method in accordance with an embodiment of the present invention.

Referring now to FIG. 2 shown is a flow diagram of a method for generating a sampling signal and using this signal to profile a selected event (in the part labeled "Sampling") and the restoration of the sample signal generator state on pipeline flushes (in the part labeled "Execution"). Method 200 may be performed using various hardware logic and software of a DBT processor.

As shown, method 200 begins during a sampling portion 201 by fetching an instruction (block 210). Note that this instruction fetch may be performed by a front end unit of the processor, such as a fetch unit. In some cases, the fetched instruction may be obtained responsive to a branch prediction made by a front end branch predictor. Next it can be determined at diamond 215 whether a profileable event has occurred. Understand that many different types of profileable events may occur in different embodiments. For purposes of discussion herein, assume that the profileable event of interest is the determination by the branch predictor of a taken branch. If this profileable event has not occurred, normal execution of the fetched instruction occurs in an execution portion 202 of method 200.

Still with reference to FIG. 2, if it is determined at diamond 215 that a profileable event has occurred, control passes to block 220 where a first random generator may be ticked. That is, this random generator may be clocked or otherwise activated such that its internal state is updated. In an embodiment in which the random generator is a LFSR, this tick may be implemented by providing an output of the branch predictor which, when active for a taken branch, acts as a clock signal for the LFSR to thus advance the state.

Next, control passes to diamond 225 where it can be determined whether a sample signal is active. This determination may be based on an output of the random generator. In the example used herein, more specifically a most significant bit of the internal state may be output (and potentially logically combined with other intermediate state values from the random generator) to generate a single bit sample signal. If this signal is determined to be active (e.g., a logic one), control passes to block 230 where profile information may be collected for the associated instruction. While different types of profile information may be collected in different embodiments, in one example this profile information may include an address of the target of a taken branch and potentially other information. One example of additional profile information is whether a conditional branch instruction is taken/not-taken and whether the branch is most often in the direction of the encoding (e.g., whether the instruction is "jump if not" and the most often outcome is fall through). Another example of profile information is memory accesses that are unaligned (e.g., not an address that is aligned to (for example, a 64 byte granularity). Note that alignment information can be obtained for target/source address information. In other cases, additional profile information may include processor context information such as control register values, addressing mode, processor mode and so forth.

Note that in some cases, to avoid the expense of collecting and storing profile information at this speculative point of the processor, the instruction can be annotated (block 240) to indicate that the instruction is to be a sampled instruction. In an embodiment, this annotation may be implemented by appending an active sampling indicator (e.g., a sample bit) to the instruction as it flows through the pipeline. As will be discussed further, this sample bit may be used to tick further random generators in the pipeline.

Still with reference to FIG. 2, control next passes to diamond 250. There, during an execution portion 202 of the instruction within the pipeline, it can be determined whether a pipeline flush (either partial or full flush) has occurred. Such flush may occur for a variety of reasons, including branch mispredictions, exceptions and violations, among many other reasons. If no such pipeline flush occurs as the instruction flows through the pipeline, downstream random generators (of which there may be one or more) may be ticked based on the sampled indicator associated with instruction. In the case of an unannotated instruction (that is not selected for sampling), no update or ticking of the downstream random generators occurs.

Understand while not shown for ease of illustration, if the instruction successfully proceeds through the pipeline and is retired, the profile information associated with a sampled instruction may be stored into a profile database. For example, in one embodiment the address of the target of the taken branch may be used as an index into this profile database to identify an entry of the database associated with the target address. Various information in this entry may be updated. In one example, an entry may include a count of a taken branches and this count may be incremented. As such, a profile database may store a count of the times that a given instruction branch has been taken and instruction branch target. Binary translation software may use this information to determine whether a particular code path is an active or hot path. For example, when the count for a particular target address exceeds a certain threshold, indicating that the target address has been executed at least the threshold number of times, the code at the target address (e.g., a basic block) may be selected for optimization using the DBT software (e.g., when the count value of an entry exceeds the threshold count value).

Still with reference to FIG. 2, if instead at diamond 250 it is determined that a flush has occurred, control passes to block 260 where one or more affected instructions may be flushed from the pipeline. More specifically, such flush operation may cause all instructions upstream from the flush point to be flushed from the pipeline such that the upstream structures can be cleared and one or more affected instructions can be re-executed beginning at the front end.

Still further responsive to a flush, at block 280 one or more random generators may be re-initialized. More specifically, a downstream random generator at a pipeline stage that was not flushed, namely a random generator that is downstream of (and closest to) the flush point, may be selected as the closest downstream random generator to the flush point. To ensure that the correct internal state is present in the upstream random generators (associated with pipeline stages undergoing a flush), a restore operation occurs such that the internal state of the closest downstream random generator can be provided to one or more upstream random generators. Thereafter, continued execution occurs with the upstream one or more random generators having a correct internal state, to enable sampling decisions to be made randomly, deterministically, and reproducibly. Understand while shown at this high level in the embodiment of FIG. 2, many variations and alternatives are possible.

Figure 3:
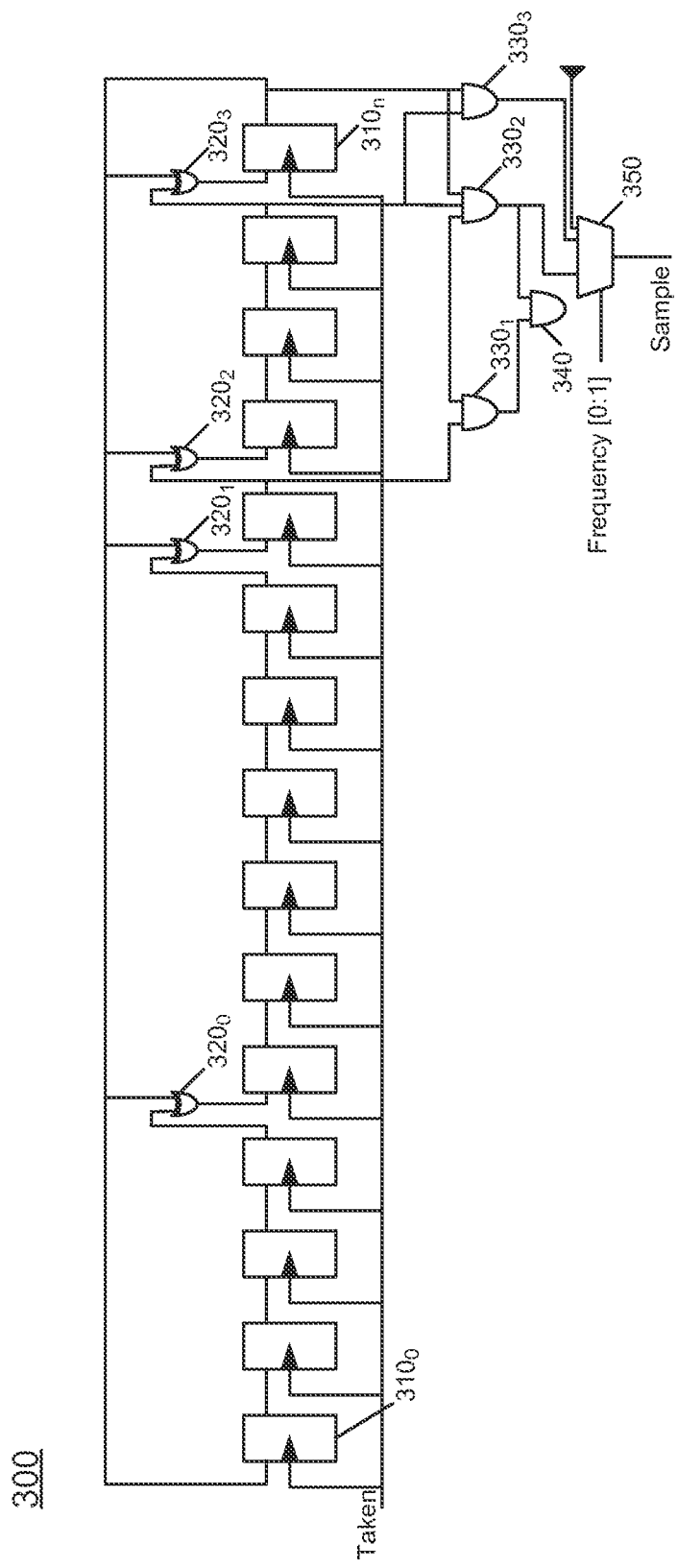
FIG. 3 is a block diagram of a random generator in accordance with one embodiment of the present invention.

Referring now to FIG. 3, shown is a block diagram of a random generator 300 in accordance with one embodiment of the present invention. More specifically, random generator 300 is implemented as an LFSR. LFSR 300 is advanced or ticked by every profileable event. In the example described herein, the event of interest is branches predicted to be taken; of course, embodiments are applicable to other events of interest. On every tick, a bit is computed based on the current state/value in the register and is fed back to the input being shifted in to compute the new value in the register. The various positions that are combined to generate the new input are termed taps. Note that the next value of the LFSR, namely the internal state of the random generator, is dependent only on the current value for a fixed set of taps. For a given initial seed and a fixed set of taps, the sequence of values of the LFSR can be deterministically predicted.

In the embodiment shown in FIG. 3, LFSR 300 includes a plurality of stages $310_0$-$310_n$. As seen, each stage 310 may be implemented as a D-type flip-flop having an input connected to a preceding flip-flop (or the last flip-flop $310_n$ for first flip-flop $310_0$ and an output coupled to the next succeeding flip-flop (or to the input of first flip-flop $310_0$ (for flip-flop $310_n$)). As seen, each stage 310 is clocked by an incoming event signal which, in an embodiment may be a taken signal to indicate when a given branch is predicted to be taken (which may be received from a branch predictor).

As seen, certain flip-flops have outputs and inputs coupled to a corresponding exclusive-OR (XOR) gate $320_0$-$320_3$, which provides for a fixed set of taps. In addition, the outputs of certain stages 310 are coupled to a first set of logic gates $330_1$-$330_3$, which in the embodiment shown may be implemented as AND gates that in turn are coupled to another AND gate 340 and/or a multiplexer 350.

Depending upon a sample rate desired (which may be set with reference to a value in an MSR, as described herein, provided as a control input (frequency [0:1] in FIG. 3), multiplexer 350 may be controlled to output a sample signal at a selected sampling rate. In the embodiment shown, multiplexer 350 may be configured to provide for sampling rates from 1/1 to 1/32. Of course understand while shown with this particular implementation in the embodiment of FIG. 3, many variations and alternatives are possible. With the particular arrangement of LFSR 300 shown in FIG. 3, a random number corresponding to the internal state the LFSR may be calculated, in one embodiment, in accordance with the following equation: $x^{15}+x^{12}+x^{11}+x^5+1$. Of course other configurations of an LFSR or another type of random number generator may lead to another deterministic equation for random generation.

As discussed, in some embodiments the random generator can be periodically re-seeded by changing the initial value and thereby the sequence of sampling signal values. In one embodiment, re-seeding may be realized by having the random number generator periodically call into the DBT software by raising an event. For example, when the LFSR reaches the same value as the seed value with which it was programmed, it can raise an event. In turn this event can be used by the DBT to re-seed the LFSR. The DBT software can also keep a record of the new seed value as well as time at which LFSR was re-seeded. In an embodiment, the seed is written into the LFSR by exposing the LFSR as an MSR (MSR_SEED) that can be programmed using a special MSR write instruction.

The sample signal is used to determine if an event is to be profiled or not. In one embodiment, a programmable sampling rate can be realized by writing a sampling rate into a MSR (MSR_RATE) and the value in this MSR is used to generate the sampling signal with the appropriate rate. This MSR can be written using a special MSR write instruction.

Consider a typical DBT system where the execution counts of block are identified by profiling the targets of the taken branches. Furthermore, in modern microarchitectures the taken/not taken information about a branch is obtained from branch predictors at the front of the pipeline and actually resolved in the middle of the pipeline. Consider a pipeline having branch resolution-based pipe flushes occurring at two stages in the pipeline. One such design is a pipeline with a branch target buffer, where pipeline flushes are generated by both a branch resolution unit (or some analogue) and by the retirement unit.

In this case, three copies of the LFSR are maintained, including a first LFSR at the front end (FE). This LFSR is ticked by every profileable event (such as predicted taken branch). The sample signal generated using the LFSR is used to determine whether the target of a specific predicted taken branch is profiled or not. If a particular branch's target is determined to be sampled, it is indicated by setting a bit in the branch instruction. A second LFSR is provided in a branch resolution unit (CFSR_BAC). This LFSR is ticked by branches with the sample bit set, which resolve the same as the prediction. In case there is a misprediction and a flush is generated, the LFSR value from this LFSR is copied into the LFSR_FE, thus restoring the correct state to the LFSR_FE. And in turn, the profiling data corresponding to the incorrectly predicted branch's target is dropped. In this embodiment, a final LFSR is associated with a retirement unit (LFSR_RET). This LFSR is ticked by branches with the sample bit set and that retire. Any pipeline flush raised by the retirement unit copies the value of the LFSR_RET to both the LFSR_BAC and LFSR_FE. The profile data corresponding to the incorrectly profiled branch targets are dropped.

Such a checkpointing mechanism ensures that the profile data generated for a given sequence of instructions depends only on the sampling rate and MSR_SEED value, and is completely independent of micro-architectural artifacts such as branch prediction accuracy.

The DBT software may, during initial boot time, initialize the random generator with an appropriate seed value. Similarly, the DBT software may re-seed the random generator with a new seed value periodically such as when a re-seed event is raised from the random generator. In an embodiment, when raised as an event (e.g., interrupt) a new seed value is written to the MSR_SEED, e.g., via an instruction.

Understand that the DBT software constantly monitors the performance of the system, specifically the number of cycles spent in creating translations, the number of executions of translated code, and so forth. Based at least on this information, the DBT software determines whether the overhead of sampling is to be reduced by switching to a lower sampling rate. If so, the DBT software can update the appropriate sampling rate by writing to the MSR_RATE MSR.

Figure 4:
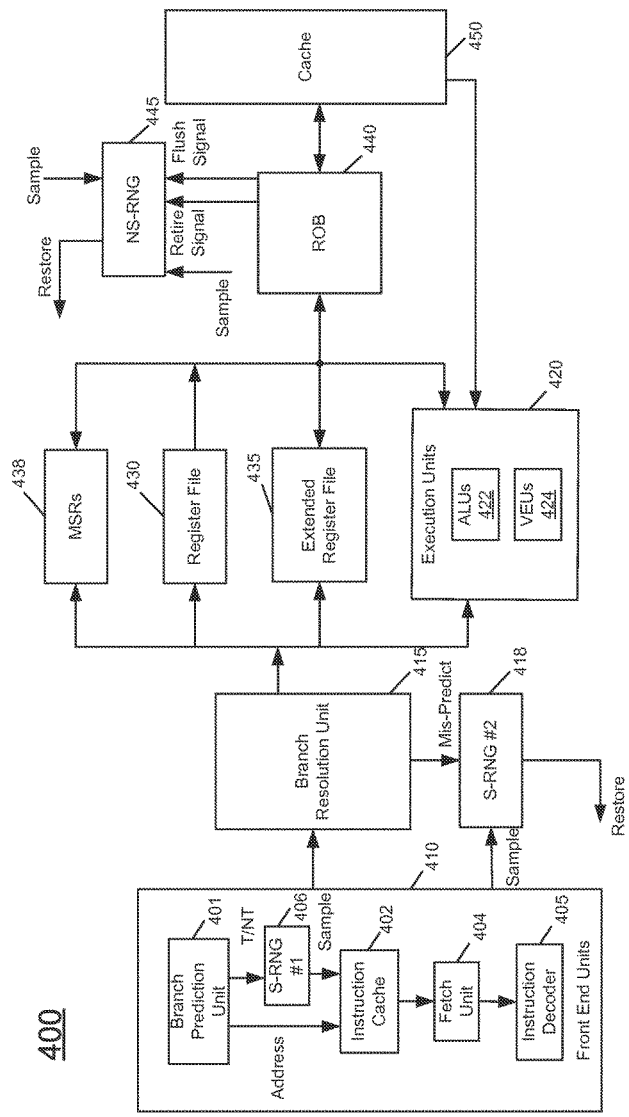
FIG. 4 is a block diagram of a micro-architecture of a processor core in accordance with one embodiment of the present invention.

Referring now to FIG. 4, shown is a block diagram of a micro-architecture of a processor core in accordance with one embodiment of the present invention. As shown in FIG. 4, processor core 400 may be a multi-stage pipelined out-of-order processor. Core 400 may operate at various voltages based on a received operating voltage, which may be received from an integrated voltage regulator or external voltage regulator.

As seen in FIG. 4, core 400 includes front end units 410, which may be used to fetch instructions to be executed and prepare them for use later in the processor pipeline. For example, front end units 410 may include a branch prediction unit 401, an instruction cache 402, a fetch unit 404, and an instruction decoder 405. In some implementations, front end units 410 may further include a trace cache, along with microcode storage as well as a micro-operation storage. Fetch unit 404 may fetch macro-instructions, e.g., from memory or instruction cache 402 in part based on predictions from branch predictor unit 401, and feed them to instruction decoder 405 to decode them into primitives, i.e., micro-operations for execution by the processor.

As further illustrated in FIG. 4, front end units 410 also include a first random number generator 406 (speculative-RNG or S-RNG). As seen, random number generator 406 may be ticked by a taken signal received from branch prediction unit 401. Responsive to this taken signal, the internal state of random number generator 406 is updated, and based on a value of, e.g., a most significant bit of this internal state, a sample signal may be generated, which when active indicates that the corresponding taken branch instruction is selected for profiling and is thus to be sampled. This sample indicator may flow with the instruction through the pipeline.

Coupled between front end units 410 and execution units 420 is a branch resolution unit 415. Branch resolution unit 415 which may, based on further information received, determine whether a selected branch was mis-predicted. If so, a mis-predict signal is sent to another random generator 418. This random number generator 418 (another speculative random number generator), which may be ticked by the sample signal generated by random number generator 406, may provide its internal state back to random number generator 406 to restore correct state as a checkpoint mechanism when a flush occurs between front end units 410 and the location of random number generator 418.

Although not shown for ease of illustration, an out-of-order (OOO) engine 415 may follow branch resolution unit 415, which may receive the micro-instructions and prepare them for execution by re-ordering micro-instruction flow and allocating various resources needed for execution, as well as to provide renaming of logical registers onto storage locations within various register files such as register file 430 and extended register file 435. Register file 430 may include separate register files for integer and floating point operations. For purposes of configuration, control, and additional operations, a set of machine specific registers (MSRs) 438 may also be present and accessible to various logic within core 400 (and external to the core). For example, information associated with sampling parameters, including sample rate, seed values and so forth may be stored in one or more MSRs, which may be written and updated responsive to MSR write instructions as described herein.

Various resources may be present in execution units 420, including, for example, various integer, floating point, and single instruction multiple data (SIMD) logic units, among other specialized hardware. For example, such execution units may include one or more arithmetic logic units (ALUs) 422 and one or more vector execution units 424, among other such execution units.

Results from the execution units may be provided to retirement logic, namely a reorder buffer (ROB) 440. More specifically, ROB 440 may include various arrays and logic to receive information associated with instructions that are executed. This information is then examined by ROB 440 to determine whether the instructions can be validly retired and result data committed to the architectural state of the processor, or whether one or more exceptions occurred that prevent a proper retirement of the instructions. Of course, ROB 440 may handle other operations associated with retirement.

When a valid retirement occurs for a sampled instruction, another random number generator 445 (a non-speculative random number generator) may be ticked such that its internal state is updated. Instead, when a flush signal is received, the value of the internal state of random number generator 445 may be used to restore a correct state to the earlier random number generators (including random number generators 406 and 418).

As shown in FIG. 4, ROB 440 is coupled to a cache 450 which, in one embodiment may be a low level cache (e.g., an L1 cache) although the scope of the present invention is not limited in this regard. Also, execution units 420 can be directly coupled to cache 450. From cache 450, data communication may occur with higher level caches, system memory and so forth. While shown with this high level in the embodiment of FIG. 4, understand the scope of the present invention is not limited in this regard. For example, while the implementation of FIG. 4 is with regard to an out-of-order machine such as of an Intel® x86 instruction set architecture (ISA), the scope of the present invention is not limited in this regard. That is, other embodiments may be implemented in an in-order processor, a reduced instruction set computing (RISC) processor such as an ARM-based processor, or a processor of another type of ISA that can emulate instructions and operations of a different ISA via an emulation engine and associated logic circuitry.

Figure 5:
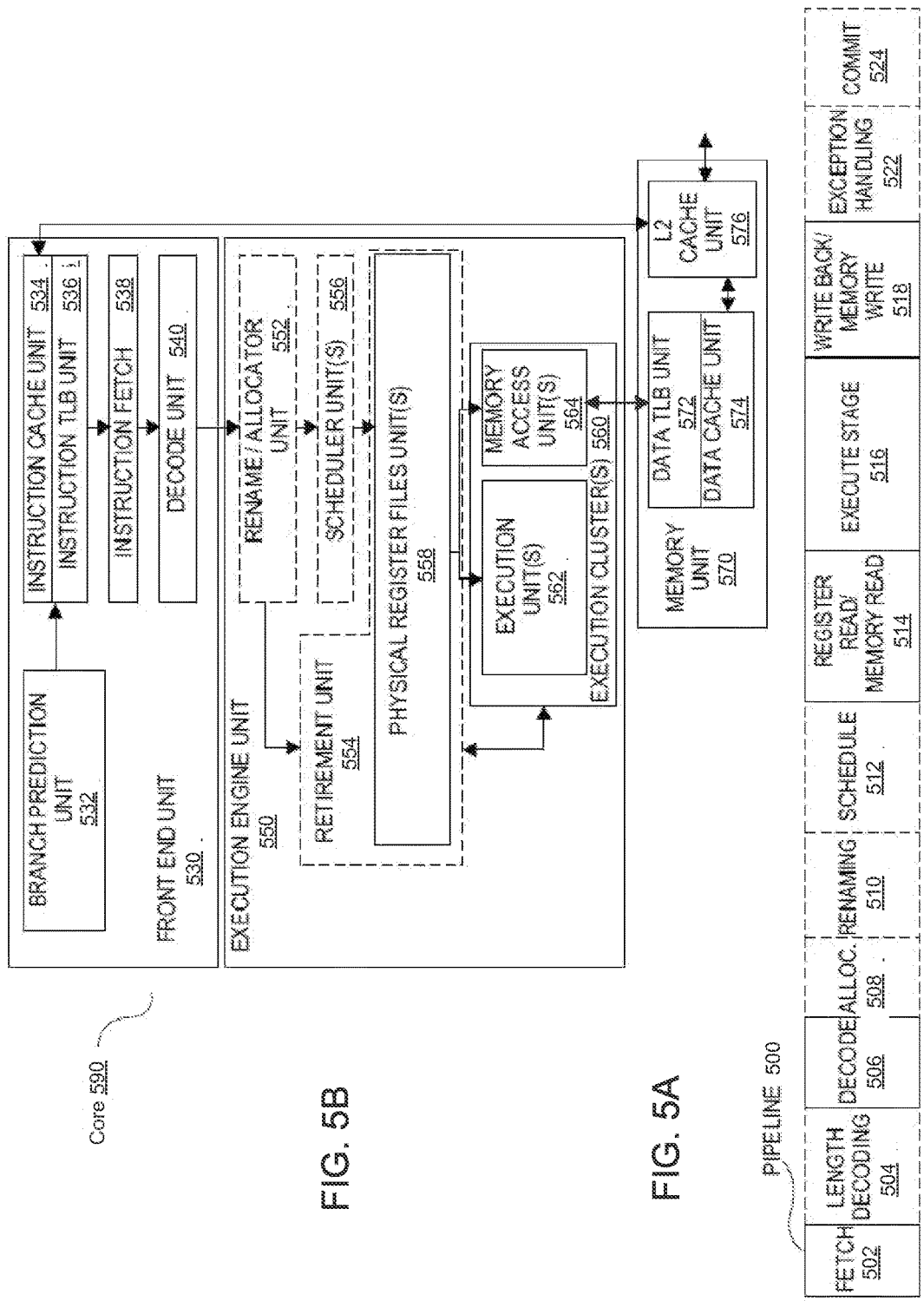
FIG. 5A is a block diagram illustrating an in-order pipeline and a register renaming stage, out-of-order issue/execution pipeline, in accordance with embodiments of the present disclosure.
FIG. 5B is a block diagram illustrating an in-order architecture core and a register renaming logic, out-of-order issue/execution logic to be included in a processor, in accordance with embodiments of the present disclosure.

FIG. 5A is a block diagram illustrating an in-order pipeline and a register renaming stage, out-of-order issue/execution pipeline, in accordance with embodiments of the present disclosure. FIG. 5B is a block diagram illustrating an in-order architecture core and a register renaming logic, out-of-order issue/execution logic to be included in a processor, in accordance with embodiments of the present disclosure. The solid lined boxes in FIG. 5A illustrate the in-order pipeline, while the dashed lined boxes illustrates the register renaming, out-of-order issue/execution pipeline. Similarly, the solid lined boxes in FIG. 5B illustrate the in-order architecture logic, while the dashed lined boxes illustrates the register renaming logic and out-of-order issue/execution logic. Understand that the pipelines illustrated in FIGS. 5A and 5B may include random number generators as described herein.

In FIG. 5A, a processor pipeline 500 may include a fetch stage 502, a length decode stage 504, a decode stage 506, an allocation stage 508, a renaming stage 510, a scheduling (also known as a dispatch or issue) stage 512, a register read/memory read stage 514, an execute stage 516, a write-back/memory-write stage 518, an exception handling stage 522, and a commit stage 524.

In FIG. 5B, arrows denote a coupling between two or more units and the direction of the arrow indicates a direction of data flow between those units. FIG. 5B shows processor core 590 including a front end unit 530 coupled to an execution engine unit 550, and both may be coupled to a memory unit 570.

Core 590 may be a reduced instruction set computing (RISC) core, a complex instruction set computing (CISC) core, a very long instruction word (VLIW) core, or a hybrid or alternative core type. In one embodiment, core 590 may be a special-purpose core, such as, for example, a network or communication core, compression engine, graphics core, or the like.

Front end unit 530 may include a branch prediction unit 532 coupled to an instruction cache unit 534. Instruction cache unit 534 may be coupled to an instruction translation lookaside buffer (TLB) 536. TLB 536 may be coupled to an instruction fetch unit 538, which is coupled to a decode unit 540. Decode unit 540 may decode instructions, and generate as an output one or more micro-operations, micro-code entry points, microinstructions, other instructions, or other control signals, which may be decoded from, or which otherwise reflect, or may be derived from, the original instructions. The decoder may be implemented using various different mechanisms. Examples of suitable mechanisms include, but are not limited to, look-up tables, hardware implementations, programmable logic arrays (PLAs), microcode read-only memories (ROMs), etc. In one embodiment, instruction cache unit 534 may be further coupled to a level 2 (L2) cache unit 576 in memory unit 570. Decode unit 540 may be coupled to a rename/allocator unit 552 in execution engine unit 550.

Execution engine unit 550 may include rename/allocator unit 552 coupled to a retirement unit 554 and a set of one or more scheduler units 556. Scheduler units 556 represent any number of different schedulers, including reservations stations, central instruction window, etc. Scheduler units 556 may be coupled to physical register file units 558. Each of physical register file units 558 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. Physical register file units 558 may be overlapped by retirement unit 554 to illustrate various ways in which register renaming and out-of-order execution may be implemented (e.g., using one or more reorder buffers and one or more retirement register files, using one or more future files, one or more history buffers, and one or more retirement register files; using register maps and a pool of registers; etc.). Generally, the architectural registers may be visible from the outside of the processor or from a programmer's perspective. The registers might not be limited to any known particular type of circuit. Various different types of registers may be suitable as long as they store and provide data as described herein. Examples of suitable registers include, but might not be limited to, dedicated physical registers, dynamically allocated physical registers using register renaming, combinations of dedicated and dynamically allocated physical registers, etc. Retirement unit 554 and physical register file units 558 may be coupled to execution clusters 560. Execution clusters 560 may include a set of one or more execution units 562 and a set of one or more memory access units 564. Execution units 562 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. Scheduler units 556, physical register file units 558, and execution clusters 560 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file unit, and/or execution cluster—and in the case of a separate memory access pipeline, certain embodiments may be implemented in which only the execution cluster of this pipeline has memory access units 564). It should also be understood that where separate pipelines are used, one or more of these pipelines may be out-of-order issue/execution and the rest in-order.

The set of memory access units 564 may be coupled to memory unit 570, which may include a data TLB unit 572 coupled to a data cache unit 574 coupled to a level 2 (L2) cache unit 576. In one exemplary embodiment, memory access units 564 may include a load unit, a store address unit, and a store data unit, each of which may be coupled to data TLB unit 572 in memory unit 570. L2 cache unit 576 may be coupled to one or more other levels of cache and eventually to a main memory.

By way of example, the exemplary register renaming, out-of-order issue/execution core architecture may implement pipeline 500 as follows: 1) instruction fetch 438 may perform fetch and length decoding stages 502 and 504; 2) decode unit 540 may perform decode stage 506; 3) rename/allocator unit 552 may perform allocation stage 508 and renaming stage 510; 4) scheduler units 556 may perform schedule stage 512; 5) physical register file units 558 and memory unit 570 may perform register read/memory read stage 514; execution cluster 560 may perform execute stage 516; 6) memory unit 570 and physical register file units 558 may perform write-back/memory-write stage 518; 7) various units may be involved in the performance of exception handling stage 522; and 8) retirement unit 554 and physical register file units 558 may perform commit stage 524.

Core 590 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.).

It should be understood that the core may support multithreading (executing two or more parallel sets of operations or threads) in a variety of manners. Multithreading support may be performed by, for example, including time sliced multithreading, simultaneous multithreading (where a single physical core provides a logical core for each of the threads that physical core is simultaneously multithreading), or a combination thereof. Such a combination may include, for example, time sliced fetching and decoding and simultaneous multithreading thereafter such as in the Intel® Hyperthreading technology.

While register renaming may be described in the context of out-of-order execution, it should be understood that register renaming may be used in an in-order architecture. While the illustrated embodiment of the processor may also include a separate instruction and data cache units 534/574 and a shared L2 cache unit 576, other embodiments may have a single internal cache for both instructions and data, such as, for example, a Level 1 (L1) internal cache, or multiple levels of internal cache. In some embodiments, the system may include a combination of an internal cache and an external cache that may be external to the core and/or the processor. In other embodiments, all of the cache may be external to the core and/or the processor.

Core 590 may be included in a general-purpose processor, such as a Core™ i3, i5, i7, 2 Duo and Quad, Xeon™, Itanium™, XScale™ or StrongARM™ processor, which may be available from Intel Corporation, of Santa Clara, Calif. The processor may be provided from another company, such as ARM Holdings, Ltd, MIPS, or others. The processor may be a special-purpose processor, such as, for example, a network or communication processor, compression engine, graphics processor, co-processor, embedded processor, or the like. The processor may be implemented on one or more chips, and may be a part of and/or may be implemented on one or more substrates using any of a number of process technologies, such as, for example, BiCMOS, CMOS, or NMOS.

Figure 6:
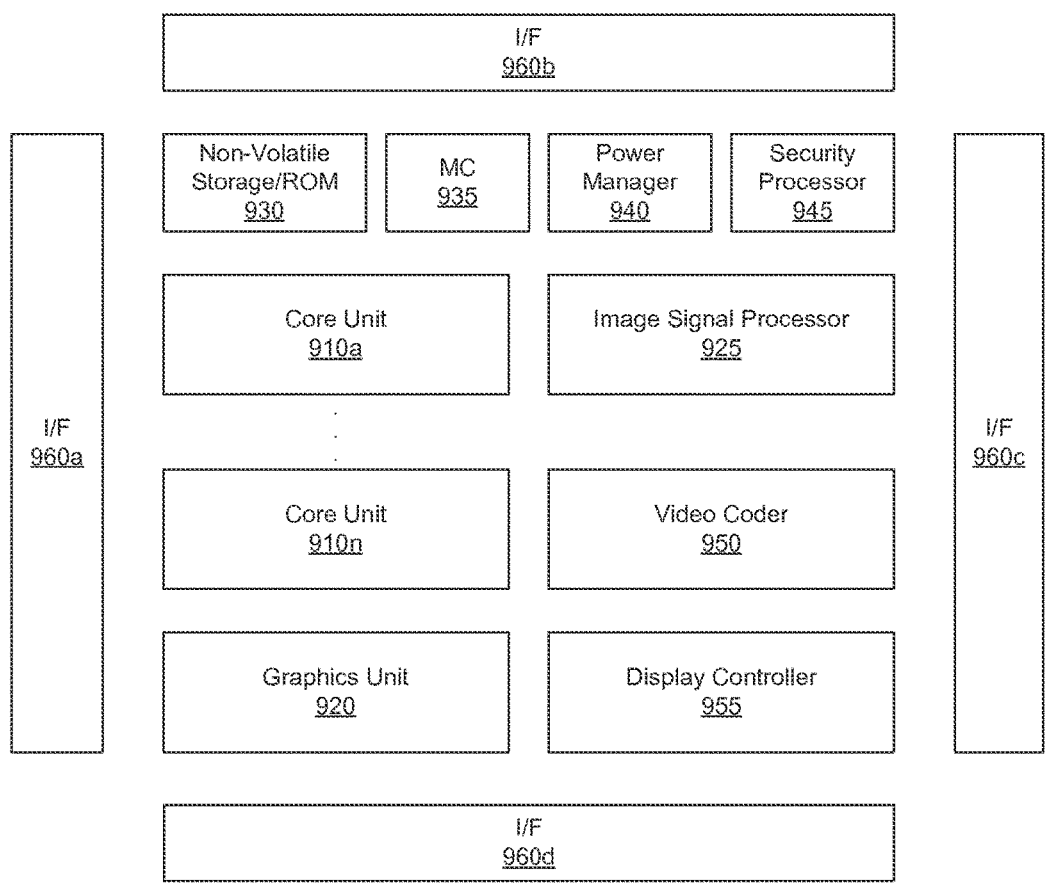
FIG. 6 is a block diagram of a processor in accordance with another embodiment of the present invention.

A processor designed using one or more cores having pipelines including random number generators as described above may be implemented in many different end products, extending from embedded devices, Internet of Things (IoT) devices, mobile devices to server systems. Referring now to FIG. 6, shown is a block diagram of a processor in accordance with another embodiment of the present invention. In the embodiment of FIG. 6, processor 900 may be a SoC including multiple domains, each of which may be controlled to operate at an independent operating voltage and operating frequency. As a specific illustrative example, processor 900 may be an Intel® Architecture Core™-based processor such as an i3, i5, i7 or another such processor available from Intel Corporation. However, other low power processors such as available from AMD of Sunnyvale, Calif., an ARM-based design from ARM Holdings, Ltd. or licensee thereof or a MIPS-based design from MIPS Technologies, Inc. of Sunnyvale, Calif., or their licensees or adopters may instead be present in other embodiments such as an Apple A7 processor, a Qualcomm Snapdragon processor, or Texas Instruments OMAP processor. Such SoC may be used in a low power system such as an embedded system, smartphone, tablet computer, phablet computer, Ultrabook™ computer or other portable computing device, which may incorporate a heterogeneous system architecture having a heterogeneous system architecture-based processor design.

In the high level view shown in FIG. 6, processor 900 includes a plurality of core units 910a-910n. Each core unit may include one or more processor cores, one or more cache memories and other circuitry, including random number generators as described herein. Each core unit 910 may support one or more instruction sets (e.g., an x86 instruction set (with some extensions that have been added with newer versions); a MIPS instruction set; an ARM instruction set (with optional additional extensions such as NEON)) or other instruction set or combinations thereof. Note that some of the core units may be heterogeneous resources (e.g., of a different design). In addition, each such core may be coupled to a cache memory (not shown) which in an embodiment may be a shared level two (L2) cache memory. A non-volatile storage 930 may be used to store various program and other data.

Each core unit 910 may also include an interface such as a bus interface unit to enable interconnection to additional circuitry of the processor. In an embodiment, each core unit 910 couples to a coherent fabric that may act as a primary cache coherent on-die interconnect that in turn couples to a memory controller 935. In turn, memory controller 935 controls communications with a memory such as a DRAM (not shown for ease of illustration in FIG. 6).

In addition to core units, additional processing engines are present within the processor, including at least one graphics unit 920 which may include one or more graphics processing units (GPUs) to perform graphics processing as well as to possibly execute general purpose operations on the graphics processor (so-called GPGPU operation). In addition, at least one image signal processor 925 may be present. Signal processor 925 may be configured to process incoming image data received from one or more capture devices, either internal to the SoC or off-chip.

Other accelerators also may be present. In the illustration of FIG. 6, a video coder 950 may perform coding operations including encoding and decoding for video information, e.g., providing hardware acceleration support for high definition video content. A display controller 955 further may be provided to accelerate display operations including providing support for internal and external displays of a system. In addition, a security processor 945 may be present to perform security operations such as secure boot operations, various cryptography operations and so forth. Each of the units may have its power consumption controlled via a power manager 940.

In some embodiments, SoC 900 may further include a non-coherent fabric coupled to the coherent fabric to which various peripheral devices may couple. One or more interfaces 960a-960d enable communication with one or more off-chip devices. Such communications may be via a variety of communication protocols such as PCIe™, GPIO, USB, I²C, UART, MIPI, SDIO, DDR, SPI, HDMI, among other types of communication protocols. Although shown at this high level in the embodiment of FIG. 6, understand the scope of the present invention is not limited in this regard.

Figure 7:
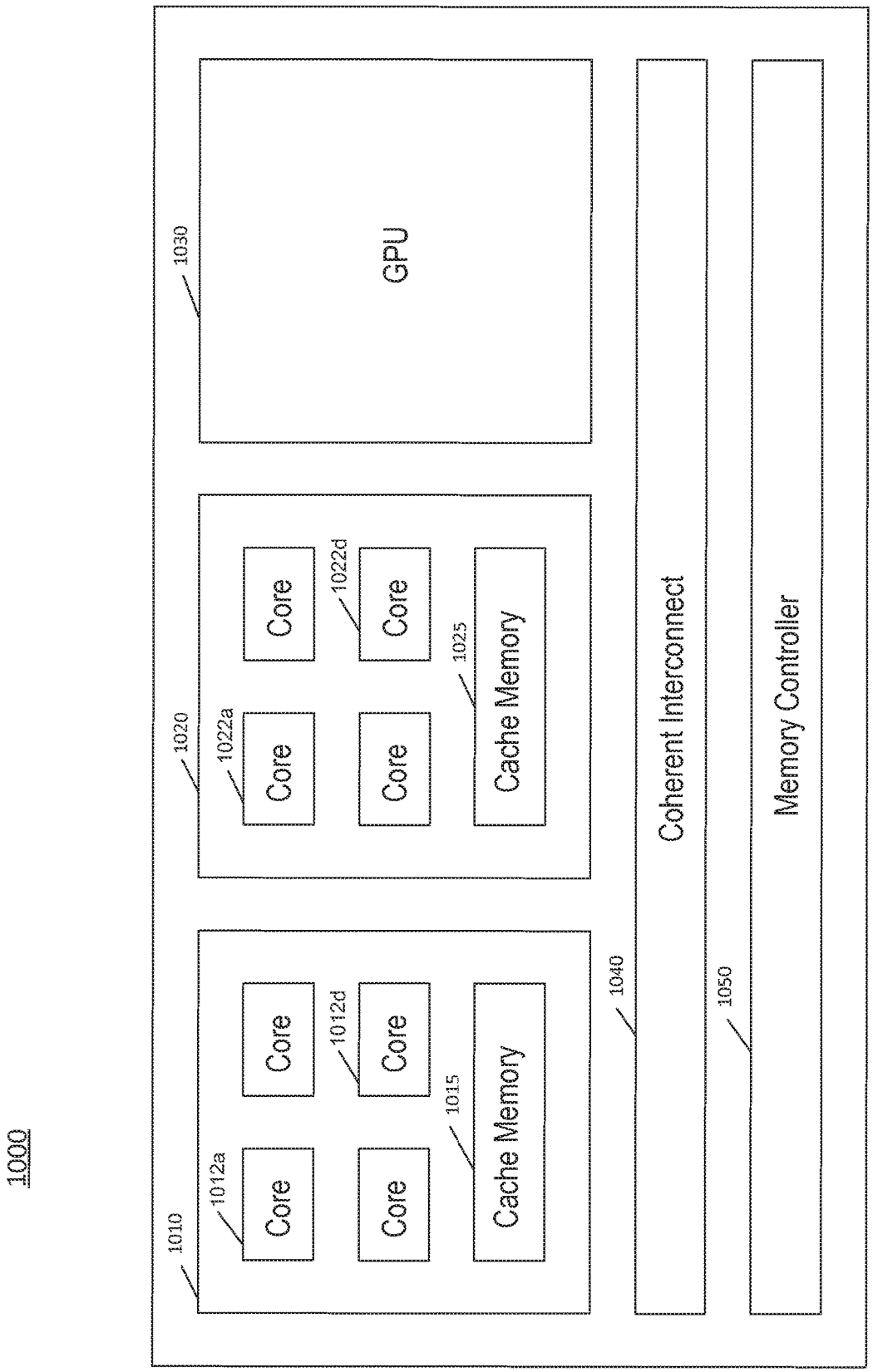
FIG. 7 is a block diagram of another example SoC in accordance with an embodiment of the present invention.

Referring now to FIG. 7, shown is a block diagram of another example SoC. In the embodiment of FIG. 7, SoC 1100 may include various circuitry to enable high performance for multimedia applications, communications and other functions. As such, SoC 1100 is suitable for incorporation into a wide variety of embedded, portable and other devices, such as smartphones, tablet computers, smart TVs and so forth. In the example shown, SoC 1100 includes a central processor unit (CPU) domain 1110. In an embodiment, a plurality of individual processor cores may be present in CPU domain 1110. As one example, CPU domain 1110 may be a quad core processor having 4 multithreaded cores. Such processors may be homogeneous or heterogeneous processors, e.g., a mix of low power and high power processor cores, and may be configured to perform the sampling random control of sampling described herein.

In turn, a GPU domain 1120 is provided to perform advanced graphics processing in one or more GPUs to handle graphics and compute APIs. A DSP unit 1130 may provide one or more low power DSPs for handling low-power multimedia applications such as music playback, audio/video and so forth, in addition to advanced calculations that may occur during execution of multimedia instructions. In turn, a communication unit 1140 may include various components to provide connectivity via various wireless protocols, such as cellular communications (including 3G/4G LTE), wireless local area protocols such as Bluetooth™, IEEE 802.11, and so forth.

Still further, a multimedia processor 1150 may be used to perform capture and playback of high definition video and audio content, including processing of user gestures. A sensor unit 1160 may include a plurality of sensors and/or a sensor controller to interface to various off-chip sensors present in a given platform. An image signal processor 1170 may be provided with one or more separate ISPs to perform image processing with regard to captured content from one or more cameras of a platform, including still and video cameras.

A display processor 1180 may provide support for connection to a high definition display of a given pixel density, including the ability to wirelessly communicate content for playback on such display. Still further, a location unit 1190 may include a GPS receiver with support for multiple GPS constellations to provide applications highly accurate positioning information obtained using as such GPS receiver. Understand that while shown with this particular set of components in the example of FIG. 7, many variations and alternatives are possible.

Figure 8:
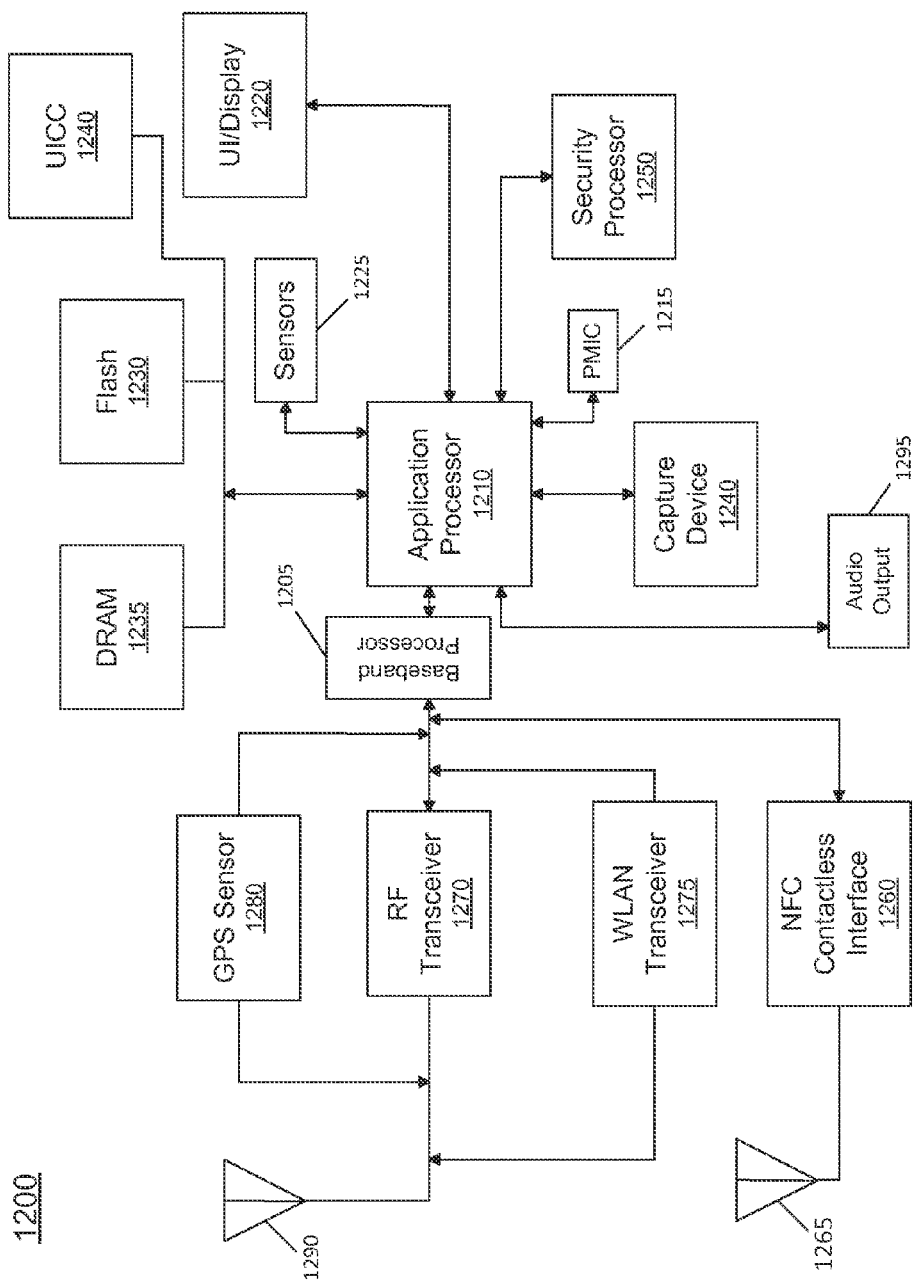
FIG. 8 is a block diagram of an example system with which embodiments can be used.

Referring now to FIG. 8, shown is a block diagram of an example system with which embodiments can be used. As seen, system 1200 may be a smartphone or other wireless communicator. A baseband processor 1205 is configured to perform various signal processing with regard to communication signals to be transmitted from or received by the system. In turn, baseband processor 1205 is coupled to an application processor 1210, which may be a main CPU of the system (such as a co-designed processor) to execute an OS and other system software, in addition to user applications such as many well-known social media and multimedia apps. Application processor 1210 may further be configured to perform a variety of other computing operations for the device.

In turn, application processor 1210 can couple to a user interface/display 1220, e.g., a touch screen display. In addition, application processor 1210 may couple to a memory system including a non-volatile memory, namely a flash memory 1230 and a system memory, namely a dynamic random access memory (DRAM) 1235. As further seen, application processor 1210 further couples to a capture device 1240 such as one or more image capture devices that can record video and/or still images.

Still referring to FIG. 8, a universal integrated circuit card (UICC) 1240 comprising a subscriber identity module and possibly a secure storage and cryptoprocessor is also coupled to application processor 1210. System 1200 may further include a security processor 1250 that may couple to application processor 1210. A plurality of sensors 1225 may couple to application processor 1210 to enable input of a variety of sensed information such as accelerometer and other environmental information. An audio output device 1295 may provide an interface to output sound, e.g., in the form of voice communications, played or streaming audio data and so forth.

As further illustrated, a near field communication (NFC) contactless interface 1260 is provided that communicates in a NFC near field via an NFC antenna 1265. While separate antennae are shown in FIG. 8, understand that in some implementations one antenna or a different set of antennae may be provided to enable various wireless functionality.

A power management integrated circuit (PMIC) 1215 couples to application processor 1210 to perform platform level power management. To this end, PMIC 1215 may issue power management requests to application processor 1210 to enter certain low power states as desired. Furthermore, based on platform constraints, PMIC 1215 may also control the power level of other components of system 1200.

To enable communications to be transmitted and received, various circuitry may be coupled between baseband processor 1205 and an antenna 1290. Specifically, a radio frequency (RF) transceiver 1270 and a wireless local area network (WLAN) transceiver 1275 may be present. In general, RF transceiver 1270 may be used to receive and transmit wireless data and calls according to a given wireless communication protocol such as 3G or 4G wireless communication protocol such as in accordance with a code division multiple access (CDMA), global system for mobile communication (GSM), long term evolution (LTE) or other protocol. In addition a GPS sensor 1280 may be present. Other wireless communications such as receipt or transmission of radio signals, e.g., AM/FM and other signals may also be provided. In addition, via WLAN transceiver 1275, local wireless communications can also be realized.

Figure 9:
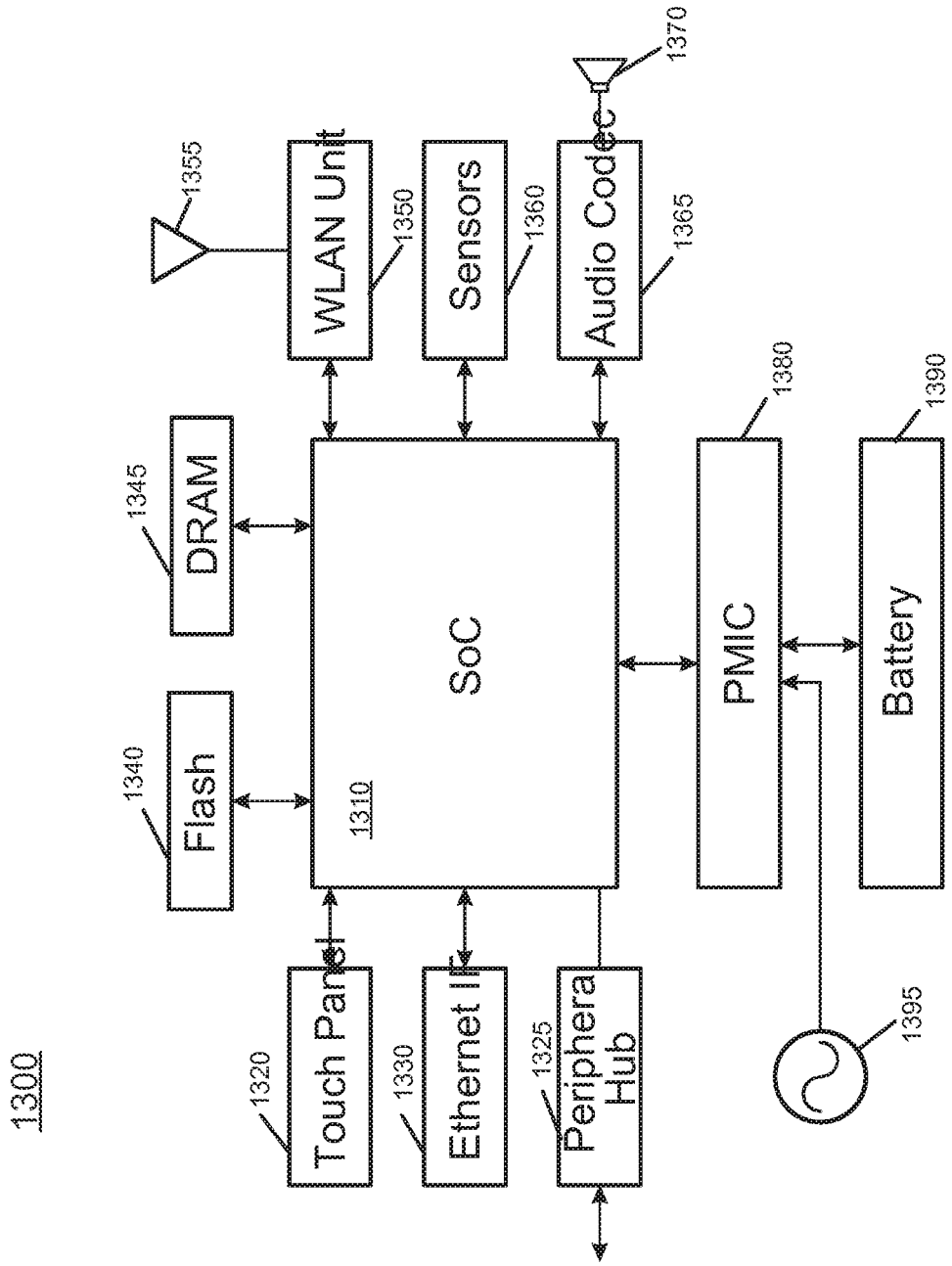
FIG. 9 is a block diagram of another example system with which embodiments may be used.

Referring now to FIG. 9, shown is a block diagram of another example system with which embodiments may be used. In the illustration of FIG. 9, system 1300 may be mobile low-power system such as a tablet computer, 2:1 tablet, phablet or other convertible or standalone tablet system. As illustrated, a SoC 1310 is present and may be configured to operate as an application processor for the device.

A variety of devices may couple to SoC 1310. In the illustration shown, a memory subsystem includes a flash memory 1340 and a DRAM 1345 coupled to SoC 1310. In addition, a touch panel 1320 is coupled to the SoC 1310 to provide display capability and user input via touch, including provision of a virtual keyboard on a display of touch panel 1320. To provide wired network connectivity, SoC 1310 couples to an Ethernet interface 1330. A peripheral hub 1325 is coupled to SoC 1310 to enable interfacing with various peripheral devices, such as may be coupled to system 1300 by any of various ports or other connectors.

In addition to internal power management circuitry and functionality within SoC 1310, a PMIC 1380 is coupled to SoC 1310 to provide platform-based power management, e.g., based on whether the system is powered by a battery 1390 or AC power via an AC adapter 1395. In addition to this power source-based power management, PMIC 1380 may further perform platform power management activities based on environmental and usage conditions. Still further, PMIC 1380 may communicate control and status information to SoC 1310 to cause various power management actions within SoC 1310.

Still referring to FIG. 9, to provide for wireless capabilities, a WLAN unit 1350 is coupled to SoC 1310 and in turn to an antenna 1355. In various implementations, WLAN unit 1350 may provide for communication according to one or more wireless protocols.

As further illustrated, a plurality of sensors 1360 may couple to SoC 1310. These sensors may include various accelerometer, environmental and other sensors, including user gesture sensors. Finally, an audio codec 1365 is coupled to SoC 1310 to provide an interface to an audio output device 1370. Of course understand that while shown with this particular implementation in FIG. 9, many variations and alternatives are possible.

Figure 10:
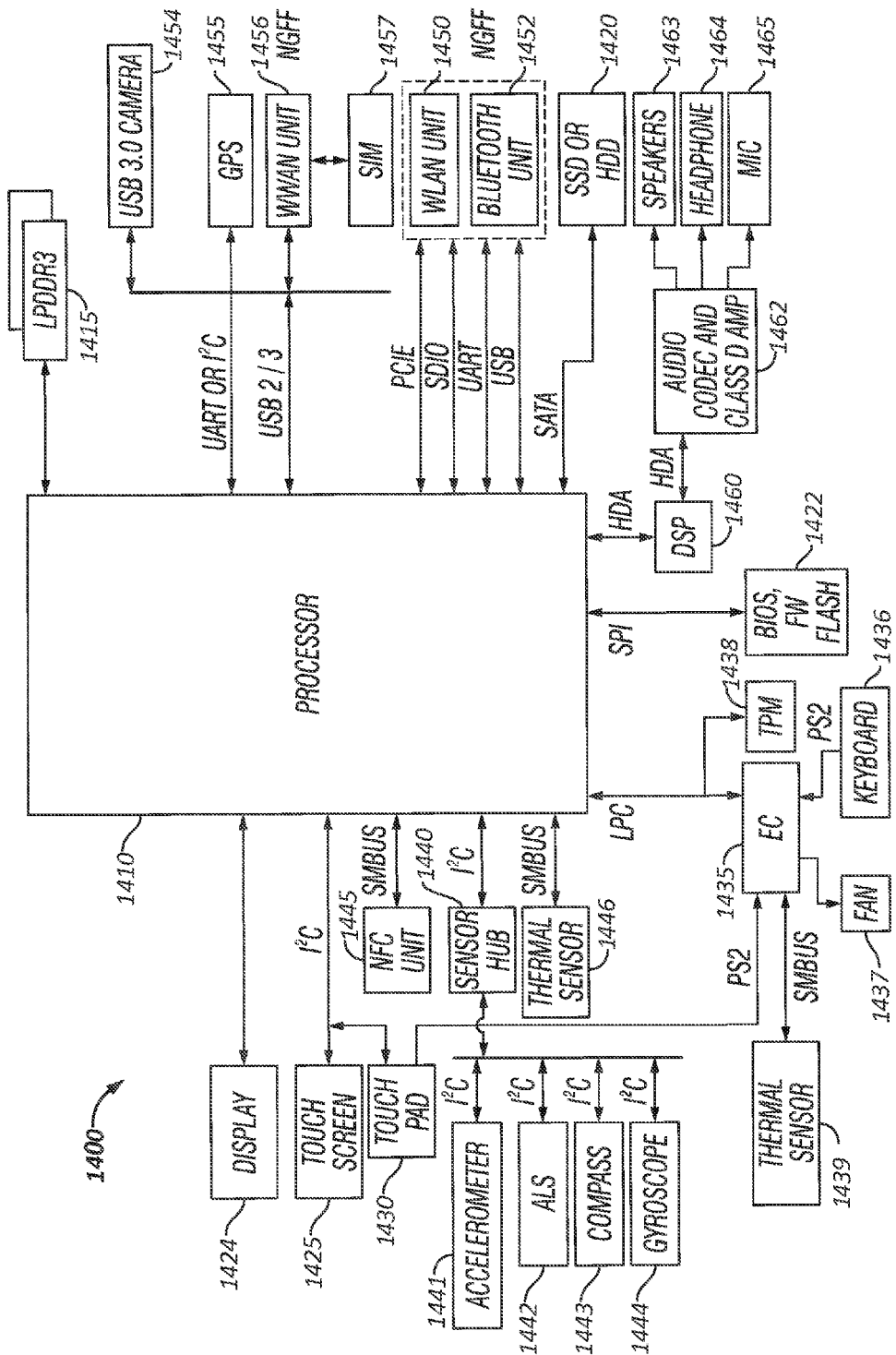
FIG. 10 is a block diagram of a representative computer system.

Referring now to FIG. 10, shown is a block diagram of a representative computer system such as notebook, Ultrabook™ or other small form factor system. A processor 1410, in one embodiment, includes a microprocessor, multi-core processor, multithreaded processor, an ultra low voltage processor, an embedded processor, or other known processing element. In the illustrated implementation, processor 1410 acts as a main processing unit and central hub for communication with many of the various components of the system 1400. As one example, processor 1410 is implemented as a SoC, which may be configured to perform the randomly controlled sampling described herein.

Processor 1410, in one embodiment, communicates with a system memory 1415. As an illustrative example, the system memory 1415 is implemented via multiple memory devices or modules to provide for a given amount of system memory.

To provide for persistent storage of information such as data, applications, one or more operating systems and so forth, a mass storage 1420 may also couple to processor 1410. In various embodiments, to enable a thinner and lighter system design as well as to improve system responsiveness, this mass storage may be implemented via a SSD or the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also shown in FIG. 10, a flash device 1422 may be coupled to processor 1410, e.g., via a serial peripheral interface (SPI). This flash device may provide for non-volatile storage of system software, including a basic input/output software (BIOS) as well as other firmware of the system.

Various input/output (I/O) devices may be present within system 1400. Specifically shown in the embodiment of FIG. 10 is a display 1424 which may be a high definition LCD or LEE) panel that further provides for a touch screen 1425. In one embodiment, display 1424 may be coupled to processor 1410 via a display interconnect that can be implemented as a high performance graphics interconnect. Touch screen 1425 may be coupled to processor 1410 via another interconnect, which in an embodiment can be an I$^2$C interconnect. As further shown in FIG. 10, in addition to touch screen 1425, user input by way of touch can also occur via a touch pad 1430 which may be configured within the chassis and may also be coupled to the same I$^2$C interconnect as touch screen 1425.

For perceptual computing and other purposes, various sensors may be present within the system and may be coupled to processor 1410 in different manners. Certain inertial and environmental sensors may couple to processor 1410 through a sensor hub 1440, e.g., via an I$^2$C interconnect. In the embodiment shown in FIG. 9, these sensors may include an accelerometer 1441, an ambient light sensor (ALS) 1442, a compass 1443 and a gyroscope 1444. Other environmental sensors may include one or more thermal sensors 1446 which in some embodiments couple to processor 1410 via a system management bus (SMBus) bus.

Also seen in FIG. 10, various peripheral devices may couple to processor 1410 via a low pin count (LPC) interconnect. In the embodiment shown, various components can be coupled through an embedded controller 1435. Such components can include a keyboard 1436 (e.g., coupled via a PS2 interface), a fan 1437, and a thermal sensor 1439. In some embodiments, touch pad 1430 may also couple to EC 1435 via a PS2 interface. In addition, a security processor such as a trusted platform module (TPM) 1438 may also couple to processor 1410 via this LPC interconnect.

System 1400 can communicate with external devices in a variety of manners, including wirelessly. In the embodiment shown in FIG. 10, various wireless modules, each of which can correspond to a radio configured for a particular wireless communication protocol, are present. One manner for wireless communication in a short range such as a near field may be via a NFC unit 1445 which may communicate, in one embodiment with processor 1410 via an SMBus. Note that via this NFC unit 1445, devices in close proximity to each other can communicate.

As further seen in FIG. 10, additional wireless units can include other short range wireless engines including a WLAN unit 1450 and a Bluetooth™ unit 1452. Using WLAN unit 1450, Wi-Fi™ communications can be realized, while via Bluetooth™ unit 1452, short range Bluetooth™ communications can occur. These units may communicate with processor 1410 via a given link.

In addition, wireless wide area communications, e.g., according to a cellular or other wireless wide area protocol, can occur via a WWAN unit 1456 which in turn may couple to a subscriber identity module (SIM) 1457. In addition, to enable receipt and use of location information, a GPS module 1455 may also be present. Note that in the embodiment shown in FIG. 10, WWAN unit 1456 and an integrated capture device such as a camera module 1454 may communicate via a given link.

To provide for audio inputs and outputs, an audio processor can be implemented via a digital signal processor (DSP) 1460, which may couple to processor 1410 via a high definition audio (HDA) link. Similarly, DSP 1460 may communicate with an integrated coder/decoder (CODEC) and amplifier 1462 that in turn may couple to output speakers 1463 which may be implemented within the chassis. Similarly, amplifier and CODEC 1462 can be coupled to receive audio inputs from a microphone 1465 which in an embodiment can be implemented via dual array microphones (such as a digital microphone array) to provide for high quality audio inputs to enable voice-activated control of various operations within the system. Note also that audio outputs can be provided from amplifier/CODEC 1462 to a headphone jack 1464. Although shown with these particular components in the embodiment of FIG. 10, understand the scope of the present invention is not limited in this regard.

One or more aspects of at least one embodiment may be implemented by representative code stored on a machine-readable medium which represents and/or defines logic within an integrated circuit such as a processor. For example, the machine-readable medium may include instructions which represent various logic within the processor. When read by a machine, the instructions may cause the machine to fabricate the logic to perform the techniques described herein. Such representations, known as "IP cores," are reusable units of logic for an integrated circuit that may be stored on a tangible, machine-readable medium as a hardware model that describes the structure of the integrated circuit. The hardware model may be supplied to various customers or manufacturing facilities, which load the hardware model on fabrication machines that manufacture the integrated circuit. The integrated circuit may be fabricated such that the circuit performs operations described in association with any of the embodiments described herein.

Figure 11:
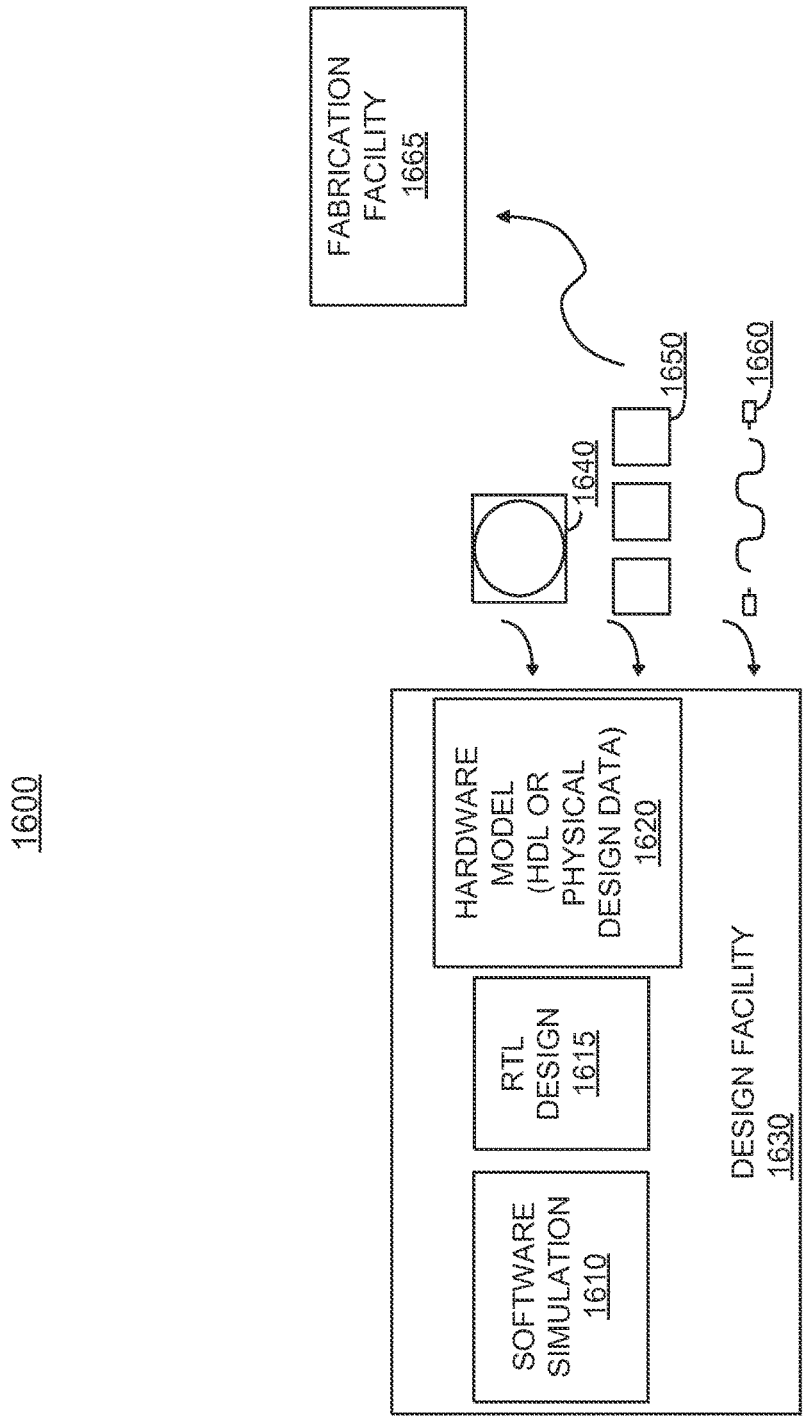
FIG. 11 is a block diagram illustrating an IP core development system used to manufacture an integrated circuit to perform operations according to an embodiment.

FIG. 11 is a block diagram illustrating an IP core development system 1600 that may be used to manufacture an integrated circuit to perform operations according to an embodiment. The IP core development system 1600 may be used to generate modular, reusable designs that can be incorporated into a larger design or used to construct an entire integrated circuit (e.g., an SoC integrated circuit). A design facility 1630 can generate a software simulation 1610 of an IP core design in a high level programming language (e.g., C/C++). The software simulation 1610 can be used to design, test, and verify the behavior of the IP core. A register transfer level (RTL) design can then be created or synthesized from the simulation model 1600. The RTL design 1615 is an abstraction of the behavior of the integrated circuit that models the flow of digital signals between hardware registers, including the associated logic performed using the modeled digital signals. In addition to an RTL design 1615, lower-level designs at the logic level or transistor level may also be created, designed, or synthesized. Thus, the particular details of the initial design and simulation may vary.

The RTL design 1615 or equivalent may be further synthesized by the design facility into a hardware model 1620, which may be in a hardware description language (HDL), or some other representation of physical design data. The HDL may be further simulated or tested to verify the IP core design. The IP core design can be stored for delivery to a third party fabrication facility 1665 using non-volatile memory 1640 (e.g., hard disk, flash memory, or any non-volatile storage medium). Alternately, the IP core design may be transmitted (e.g., via the Internet) over a wired connection 1650 or wireless connection 1660. The fabrication facility 1665 may then fabricate an integrated circuit that is based at least in part on the IP core design. The fabricated integrated circuit can be configured to perform operations in accordance with at least one embodiment described herein.

The following examples pertain to further embodiments.

In one example, a processor includes: a front end unit to fetch and decode an instruction, the front end unit including a first random number generator to generate a random value responsive to a profileable event associated with the instruction; and a profile logic to collect profile information associated with the instruction responsive to a sample signal, the sample signal based on at least a portion of the random value.

In an example, the profile logic is to collect the profile information associated with a plurality of profileable events randomly, deterministically and reproducibly, based on a sequence of random values generated by the first random number generator.

In an example, the processor of one or more of the above examples further comprises a first logic to seed the first random number generator with a seed value stored in a first register responsive to a first instruction.

In an example, the first logic is to control a sample rate of the sample signal, based on a sample rate value stored in a second register, responsive to a second instruction.

In an example, the first number generator is to issue an event responsive to generation of a random number corresponding to the seed value, to enable the first random number generator to be re-seeded with a new seed value.

In an example, the processor of one or more of the above examples further comprises a branch resolution unit coupled to the front end unit, the branch resolution unit to determine whether the instruction is mispredicted, and if so to cause a pipeline flush of a first portion of the processor, the branch resolution unit associated with a second random number generator to generate a second random value responsive to the sample signal.

In an example, the processor of one or more of the above examples further comprises logic to restore the first random number generator with a state of the second random number generator, responsive to the pipeline flush of the first portion of the processor.

In an example, the processor of one or more of the above examples further comprises a profile database having a plurality of entries each to store profile information for a sampled event, where the profile logic is to store the profile information associated with the instruction in the profile database after retirement of the instruction.

In an example, the profile logic is to not store the profile information associated with the instruction in the profile database if the instruction is flushed prior to retirement.

Note that the above processor can be implemented using various means.

In an example, the processor comprises a SoC incorporated in a user equipment touch-enabled device.

In another example, a system comprises a display and a memory, and includes the processor of one or more of the above examples.

In another example, a method comprises: determining, in a front end unit of a processor, whether a profileable event has occurred for an instruction; updating a state of a random number generator responsive to the profileable event; associating a sample indicator with the instruction responsive to a sample signal generated by the random number generator based on the update to the random number generator state; and retiring the instruction after execution in the processor and storing profiling information associated with the instruction in an entry of a profiling database, responsive to the sample indicator.

In an example, the method further comprises flushing one or more instructions including the instruction from a pipeline of the processor prior to retirement, and causing a state of the random number generator to be updated with a state of a second random number generator, the second random number generator located downstream of the first random number generator.

In an example, the method further comprises not associating the sample indicator with the instruction associated with the profileable event if an output of the random number generator is of a second value.

In another example, a computer readable medium including instructions is to perform the method of any of the above examples.

In another example, a computer readable medium including data is to be used by at least one machine to fabricate at least one integrated circuit to perform the method of any one of the above examples.

In another example, an apparatus comprises means for performing the method of any one of the above examples.

In a still further example, a processor comprises: a pipeline having a front end unit, an execution unit, and a retirement unit, the pipeline to execute instructions; a plurality of random number generators coupled to the pipeline to generate random numbers responsive to one or more events occurring in the pipeline; sample logic to obtain profile information of at least some of the one or more events based on an output of a first random number generator of the plurality of random number generators; and a binary translation logic to optimize code based at least in part on the profile information.

In an example, the sample logic is to select at least some of the one or more events to profile randomly, where the at least some events are deterministic and reproducible.

In an example, the processor further comprises a control logic to store a seed value in a first register, the seed value to seed at least the first random number generator.

In an example, the first random number generator is to issue a re-seed signal when an internal state of the first random number generator is advanced to the seed value, to enable the first random number generator to be re-seeded with another seed value.

In an example, the plurality of random number generators includes a second random number generator, and responsive to a flush of a portion of the pipeline, the second random number generator is to provide an internal state of the second random number generator to restore the first random number generator to a checkpoint value.

In an example, the first random number generator is to output a sample signal responsive to a first event associated with a first instruction.

In an example, the first instruction is to flow through the pipeline with an active sample indicator responsive to the sample signal.

In an example, the sample logic, responsive to retirement of the first instruction with the active sample indicator, is to update an entry of a profile database associated with the first instruction.

In an example, the binary translation logic is to optimize a basic block associated with the first instruction responsive to a count value of the entry of the profile database exceeding a threshold.

Understand that various combinations of the above examples are possible.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
   a front end unit to fetch and decode an instruction, the front end unit including a first random number generator to generate a random value responsive to a profileable event associated with the instruction and to output a sample signal based on a portion of the random value;
   a profile logic to collect profile information associated with the instruction responsive to an active state of the sample signal and append a sample indicator to the instruction;
   a branch resolution unit coupled to the front end unit, the branch resolution unit to determine whether the instruction is mispredicted, and if so to cause a pipeline flush of a first portion of the processor;
   a second random number generator associated with the branch resolution unit to generate a second random value responsive to the sample signal; and
   logic to restore the first random number generator with a state of the second random number generator, responsive to the pipeline flush of the first portion of the processor.

2. The processor of claim 1, wherein the profile logic is to collect the profile information associated with a plurality of profileable events randomly, deterministically and reproducibly, based on a sequence of random values generated by the first random number generator.

3. The processor of claim 1, further comprising a first logic to seed the first random number generator with a seed value stored in a first register responsive to a first instruction.

4. The processor of claim 3, wherein the first logic is to control a sample rate of the sample signal, based on a sample rate value stored in a second register, responsive to a second instruction.

5. The processor of claim 3, wherein the first number generator is to issue an event responsive to generation of a random number corresponding to the seed value, to enable the first random number generator to be re-seeded with a new seed value.

6. The processor of claim 1, further comprising a profile database having a plurality of entries each to store profile information for a sampled event, wherein the profile logic is to store the profile information associated with the instruction in the profile database after retirement of the instruction.

7. The processor of claim 6, wherein the profile logic is to not store the profile information associated with the instruction in the profile database if the instruction is flushed prior to retirement.

8. A non-transitory machine-readable medium having stored thereon data, which if used by at least one machine, causes the at least one machine to fabricate at least one integrated circuit to perform a method comprising:
   determining, in a front end unit of a processor, whether a profileable event has occurred for an instruction;
   updating a state of a random number generator responsive to the profileable event;
   associating a sample indicator with the instruction responsive to an active state of a sample signal output by the random number generator based on the update to the random number generator state;
   if one or more instructions including the instruction are flushed from a pipeline of the processor prior to retirement, causing a state of the random number generator to be updated with a state of a second random number generator, the second random number generator located downstream of the first random number generator; and
   if the instruction is not flushed, retiring the instruction after execution in the processor and storing profiling information associated with the instruction in an entry of a profiling database, responsive to the sample indicator.

9. The non-transitory machine-readable medium of claim 8, wherein the method further comprises not associating the sample indicator with the instruction associated with the profileable event if an output of the random number generator is of a second value.

10. A processor comprising:
a pipeline having a front end unit, an execution unit, and a retirement unit, the pipeline to execute instructions;
a plurality of random number generators coupled to the pipeline to generate random numbers responsive to one or more events occurring in the pipeline;
sample logic to obtain profile information of at least some of the one or more events based on an active state of a first portion of an output of a first random number generator of the plurality of random number generators, wherein the plurality of random number generators includes a second random number generator, and responsive to a flush of a portion of the pipeline, the second random number generator is to provide an internal state of the second random number generator to restore the first random number generator to a checkpoint value; and
a binary translation logic to optimize code based at least in part on the profile information.

11. The processor of claim 10, wherein the sample logic is to select at least some of the one or more events to profile randomly, wherein the at least some events are deterministic and reproducible.

12. The processor of claim 10, further comprising a control logic to store a seed value in a first register, the seed value to seed at least the first random number generator.

13. The processor of claim 12, wherein the first random number generator is to issue a re-seed signal when an internal state of the first random number generator is advanced to the seed value, to enable the first random number generator to be re-seeded with another seed value.

14. The processor of claim 10, wherein the first random number generator is to output a sample signal responsive to a first event associated with a first instruction.

15. The processor of claim 14, wherein the first instruction is to flow through the pipeline with an active sample indicator responsive to the sample signal.

16. The processor of claim 15, wherein the sample logic, responsive to retirement of the first instruction with the active sample indicator, is to update an entry of a profile database associated with the first instruction.

17. The processor of claim 16, wherein the binary translation logic is to optimize a basic block associated with the first instruction responsive to a count value of the entry of the profile database exceeding a threshold.

* * * * *